Patented Dec. 8, 1936

2,063,223

UNITED STATES PATENT OFFICE 2,063,223

ALCOHOLIC FERMENTATION OF SUGAR-CONTAINING LIQUIDS

Firmin Boinot, Melle, Deux-Sevres, France

No Drawing. Application June 11, 1934, Serial No. 730,151. In France June 12, 1933

7 Claims. (Cl. 195—110)

When a sugar liquor is inoculated with a small quantity of yeast and the medium is protected from infective organisms, either by asepsis or by antisepsis, a certain time elapses during which no fermentative manifestation is perceived.

During this period, called "period of incubation", the yeast that has been added exercises principally vegetative functions and multiplies itself. Then alcoholic fermentation appears, progresses and follows its normal course up to the complete conversion of the sugar contained in the medium.

During a part of the process, the fermentative and vegetative functions of the yeast are exercised parallelly, but the latter functions stop when the cellular development reaches a certain concentration that may be called "specific cellular saturation", which is limited by the requirement that each cell possesses of reserving for itself a certain field of action for carrying out its diastasic functions to the maximum extent.

If, at this moment, a new volume of fresh sugar liquor is introduced into the mass undergoing fermentation, it is quite evident that the state of cellular saturation is destroyed and that new yeast cells will be born in order to reestablish it. This is what takes place in the practice of what is called "continuous" industrial fermentation which has been employed for a long time.

The term "specific cellular saturation" used above and hereinafter and in the appended claims is defined in the following way: When a sugar-containing liquor is inoculated with yeast the latter propagates new yeast cells which, in turn, multiply until their number cannot increase in the solution: from this moment, the yeast cells can manifest only their fermentative capacity, and cannot propagate, and to this condition is applied the term "cellular saturation": and the "cellular saturation" of any one liquor that has arrived at such saturation point, being dependent upon the composition and nutrient content thereof, is termed its "specific cellular saturation".

Now it is known that the formation of yeast involves a certain consumption of sugar which ordinarily reaches from 3% to 6% of the weight of sugar initially used.

I have found that advantage may be taken of this "specific cellular saturation" to obtain an increased yield of alcohol in relation to that obtained in current practice. The process (which forms the subject matter of United States application Serial No. 654,759) consists essentially in continuing the fermentation until the "specific cellular saturation" is attained, then extracting all the yeast by usual means (filtration, centrifuging, precipitation) and using again the yeast thus recovered for the fermentation of a new volume of sugar liquor such that the total resultant volume shall be equal to the first. The cellular saturation is thus attained and the second fermentation proceeds very rapidly without the formation of new yeast.

The number of times for which the revived yeast may successively be used may thus in certain cases be unlimited, and it is generally very high. In virtue of this fact the production of new yeast cells is suppressed, and economy in the so-called "constructive" consumption of sugar, results.

It is known that at the moment when the "specific cellular saturation" point is reached, as required for the above invention, the yeast concentration may vary within fairly wide limits.

Applicant has found:

1st. That a high "specific cellular saturation" may be prejudicial to obtaining the highest alcohol yields.

2nd. That the best results were obtained when the "specific cellular saturation" was kept at about 10 kilograms of yeast (having 75% of water) to 1000 litres of sugar liquor to be fermented.

3rd. That it is possible in industrial working to keep the "specific cellular saturation" constant at the optimum limit, at about 10 kilograms of yeast (having 75% of water) to 1000 litres of sugar liquor to be fermented.

The maintenance of this optimum cellular saturation, which is the object of the present invention, may be effected in several ways;

For example, by suppressing the whole or a part of materials assisting the growth of yeast cells, and in particular nitrogenous materials;

Or again, by adding to the sugar liquor to be fermented certain substances capable of impeding the vegetable functions of the yeast cells without arresting their diastasic action. These substances may be, for example furfurol and ulmic acids, which are easily obtainable by the action of mineral acids at high temperature on waste vegetable materials, or again, by ferric chloride, zinc sulphate, etc.

In accordance with the present invention my improved process for the alcoholic fermentation of sugar-containing liquors to increase the alcohol yield therefrom consists in maintaining constant the "specific cellular saturation" of the yeast, once this saturation has been attained, by removing the yeast present in the liquor and using this yeast again for the fermentation of a fresh volume of sugar liquor such that the total resultant volume is equal to the first, characterized by the fact that means are employed whereby the said cellular saturation is maintained at a value not exceeding 10 kilograms of yeast having 75% of water to 1000 litres of sugar liquor to be fermented.

Three examples are given below by way of example (but not of limitation) and will make the manner in which the present invention may be realized easily understood.

Example I

To 1000 litres of a sugar liquor consisting of apple juice containing 10% of sugar expressed as saccharose preliminarily freed of the whole or a part of the nitrogenous content, by extraction, precipitation, or any other known means, is added a quantity of yeast equivalent to 8 kilograms of yeast having 75% of water. This is allowed to ferment, then all the yeast is removed by known means, for example by centrifuging, filtration, or precipitation. Due to the lack of nitrogen, the mass of yeast thus removed does not exceed an amount equivalent to 10 kilograms of yeast having 10% of water.

This yeast is now placed in fresh sugar liquor, also free from, or poor in, nitrogen, such that the volume of the mixture is also equal to 1000 litres. A new fermentation takes place similar to the first, and another fermentation or a great number of other fermentations may then be carried out, care being taken that the weight of yeast does not reach an amount equivalent to 10 kilograms of yeast having 75% of water.

Example II

To 1000 litres of sugar liquor consisting of molasses liquor containing 15% of saccharose is added a quantity of yeast equivalent to 6 kilograms of yeast having 75% of water. There is also added a suitable amount of furfurol, which may vary from 0.5 to 10 grams per litre. This is allowed to ferment and then the whole of the yeast is removed by known means. It is ascertained that the mass of yeast thus extracted does not exceed a quantity equivalent to 10 kilograms of yeast having 75% of water. This yeast is then placed in fresh sugar liquor (to which the amount of furfurol is added) such that the volume of the mixture is also 1000 litres. A fresh fermentation takes place, similar to the first, and another, or a number of other fermentations may take place without the mass of yeast reaching an amount equivalent to 10 kilograms of yeast having 75% of water.

Example III

To 1000 litres of fresh sugar beet liquor containing 12% of saccharose is added a quantity of yeast equivalent to 10 kilograms of yeast having 75% of water.

There is also added a suitable amount of ulmic acids, which may vary from 1 to 20 grams per litre.

This is allowed to ferment and then all the yeast is removed by known means. It is ascertained that the mass of yeast thus removed does not exceed an amount equivalent to 10 kilograms of yeast having 75% of water.

This yeast is then placed in fresh sugar liquor to which the suitable amount of ulmic acid is added, and such that the total volume of the mixture is equal to 1000 litres.

A new fermentation similar to the first is carried out and in this way there may be carried out another, or a number of other, fermentations without the mass of yeast substantially exceeding an amount equivalent to 10 kilograms of yeast having 75% of water.

These examples are given to allow one skilled in the art to carry out the present invention but it is obvious that any means employed with the object of limiting the "specific cellular saturation" to an amount of yeast of the order of 10 kilograms of yeast (having 75% of water), to 1000 litres of sugar liquor to be fermented, will be completely within the scope of the present invention.

What I claim is:—

1. In the alcoholic fermentation of sugar-containing nutrient solutions by means of yeast, the steps of controlling the composition of the solution to be fermented so that the "specific cellular saturation" of the yeast cannot exceed 10 kilograms of yeast having 75 per cent. of water to 1,000 litres of sugar solution to be fermented, initiating fermentation of the sugar by the yeast, continuing said fermentation until the said "specific cellular saturation" is attained, and maintaining the said "specific cellular saturation" at the said value in subsequent fermentations by removing the whole of the yeast then present in the solution and using this yeast for the fermentation, under the same conditions, of a fresh volume of solution equal in volume in composition to the first solution.

2. In the alcoholic fermenation of sugar-containing nutrient solutions by means of yeast, the steps of eliminating from the sugar solution to be fermented part of any nutrients other than the sugar itself which assists the growth of yeast cells so that the "specific cellular saturation" of the yeast cannot exceed 10 kilograms of yeast having 75 per cent. of water to 1,000 litres of sugar solution to be fermented, initiating fermentation of the sugar by the yeast, continuing said fermentation until the said "specific cellular saturation" is attained, and maintaining the said "specific cellular saturation" at the said value in subsequent fermenations by removing the whole of the yeast then present in the solution and using this yeast for the fermentation, under the same conditions, of a fresh volume of solution equal in volume and in composition to the first solution.

3. In the alcoholic fermentation of sugar-containing nutrient solutions by means of yeast, the step of adding to the sugar solution to be fermented substances capable of inhibiting the propagation of the yeast cells without arresting their enzymatic action, so that the "specific cellular saturation" of the yeast cannot exceed 10 kilograms of yeast having 75 per cent. of water to 1,000 litres of sugar solution to be fermented, initiating fermentation of the sugar by the yeast, continuing said fermentation until the said "specific cellular saturation" is attained, and maintaining the said "specific cellular saturation" at the said value in subsequent fermentations by removing the whole of the yeast then present in the solution and using this yeast for the fermentation, under the same conditions, of a fresh volume of solution equal in volume and in composition to the first solution.

4. In the alcoholic fermentation of sugar-containing nutrient solutions by means of yeast, the steps of adding to the sugar solution to be fermented ulmic acids so that the "specific cellular saturation" of the yeast can not exceed 10 kilograms of yeast having 75 per cent. of water to 1,000 litres of sugar solution to be fermented, initiating fermentation of the sugar by the yeast, continuing said fermentation until the said "specific cellular saturation" is attained, and maintaining the said "specific cellular saturation" at the said value in subsequent fermentations by removing the whole of the yeast then present in the solution and using this yeast for the fermentation, under the same conditions, of a fresh volume of solution equal in volume and in composition to the first solution.

5. In the alcoholic fermentation of sugar-containing nutrient solutions by means of yeast, the steps of adding to the sugar solution to be fermented furfurol so that the "specific cellular saturation" of the yeast can not exceed 10 kilograms of yeast having 75 per cent. of water to 1,000 litres of sugar solution to be fermented, initiating fermentation of the sugar by the yeast, continuing said fermentation until the said "specific cellular saturation" is attained, and maintaining the said "specific cellular saturation" at the said value in subsequent fermentations by removing the whole of the yeast then present in the solution and using this yeast for the fermentation, under the same conditions, of a fresh volume of solution equal in volume and in composition to the first solution.

6. In the alcoholic fermentation of sugar-containing nutrient solutions by means of yeast, the steps of adding to the sugar solution to be fermented ferric chloride, so that the "specific cellular saturation" of the yeast cannot exceed 10 kilograms of yeast having 75 per cent. of water to 1,000 litres of sugar solution to be fermented, initiating fermentation of the sugar by the yeast, continuing said fermentation until the said "specific cellular saturation" is attained, and maintaining the said "specific cellular saturation" at the said value in subsequent fermentations by removing the whole of the yeast then present in the solution and using this yeast for the fermentation, under the same conditions, of a fresh volume of solution equal in volume and in composition to the first solution.

7. In the alcoholic fermentation of sugar-containing nutrient solutions by means of yeast, the steps of eliminating from the sugar solutions to be fermented part of the nitrogenous nutrients therein, so that the "specific cellular saturation" of the yeast cannot exceed 10 kilograms of yeast having 75 per cent. of water to 1,000 litres of sugar solution to be fermented, initiating fermentation of the sugar by the yeast, continuing said fermentation until the said "specific cellular saturation" is attained, and maintaining the said "specific cellular saturation" at the said value in subsequent fermentations by removing the whole of the yeast then present in the solution and using this yeast for the fermentation, under the same conditions, of a fresh volume of solution equal in volume and in composition to the first solution.

FIRMIN BOINOT.